(12) United States Patent
Sonokawa et al.

(10) Patent No.: US 11,578,803 B2
(45) Date of Patent: Feb. 14, 2023

(54) CARTRIDGE SEAL ASSEMBLY FOR ROTATIONAL EQUIPMENT

(71) Applicant: United Technologies Corporation, Farmington, CT (US)

(72) Inventors: Masayoshi Sonokawa, West Hartford, CT (US); Jonathan F. Zimmitti, Glastonbury, CT (US); Nasr A. Shuaib, Watertown, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 219 days.

(21) Appl. No.: 16/679,882

(22) Filed: Nov. 11, 2019

(65) Prior Publication Data
US 2021/0140547 A1    May 13, 2021

(51) Int. Cl.
*F16J 15/34*    (2006.01)
*F02C 7/28*    (2006.01)

(52) U.S. Cl.
CPC ............. *F16J 15/3452* (2013.01); *F02C 7/28* (2013.01); *F16J 15/3464* (2013.01); *F05D 2220/323* (2013.01); *F05D 2240/55* (2013.01)

(58) Field of Classification Search
CPC ...... F16J 15/3452; F16J 15/3464; F16J 15/34; F16J 15/3436; F16J 15/348; F02C 7/28; F05D 2220/323; F05D 2240/55
See application file for complete search history.

(56) References Cited

U.S. PATENT DOCUMENTS

| 3,841,642 | A |   | 10/1974 | Kirker |
| 3,897,957 | A |   | 8/1975 | Warner |
| 4,605,235 | A | * | 8/1986 | Sundberg ............. F16J 15/3464 277/306 |
| 2019/0063247 | A1 |   | 2/2019 | Walker |

OTHER PUBLICATIONS

EP search report for 20206569.4 dated Mar. 31, 2021.

* cited by examiner

*Primary Examiner* — Gilbert Y Lee
(74) *Attorney, Agent, or Firm* — Getz Balich LLC

(57) ABSTRACT

An assembly includes a housing, a carrier, a spring element and a seal element. The housing includes a bore and an annular groove that extends axially along a centerline into the housing from the bore. The carrier projects axially along the centerline into the annular groove. The carrier is configured to translate axially along the centerline relative to the housing. The spring element is arranged within the annular groove. The spring element is configured to bias the carrier axially away from the housing along the centerline. The seal element is mounted to the carrier and arranged within the bore.

17 Claims, 14 Drawing Sheets

CARTRIDGE SEAL ASSEMBLY FOR ROTATIONAL EQUIPMENT

BACKGROUND OF THE DISCLOSURE

1. Technical Field

This disclosure relates generally to rotational equipment and, more particularly, to a seal assembly for sealing a gap between a rotating component and a stationary component.

2. Background Information

A gas turbine engine typically includes various seal assemblies for sealing gaps between stationary components and rotating components. Various types of seal assemblies are known in the art.

Seal assemblies for main shaft bearing compartments of gas turbine engines take up design space. Design space reduction is a challenge for future aircraft engine products. Furthermore, future aircraft engine products may require cycles that have significantly higher rotor speeds thereby increasing bearing compartment seal rubbing speeds. Such increased rubbing speeds may increase seal wear and/or heat generation, which may in turn shorten engine products cycles.

Traditionally, a seal contact load, which creates seal contact pressure with a rotating seal face plate is minimized to reduce higher seal wear, while keeping higher seal rubbing speed at the same time. The seal contact load is determined to keep the seal assembly tracking the rotating seal face plate. Due to miscellaneous rotating seal face plate errors such as assembly run-out, part geometry etc., and environment conditions, a seal assembly is typically designed to apply an axial load to keep appropriate contact between the seal assembly and the rotating seal face plate. Seal assembly weight is one factor in determining the seal axial contact load. Reduction of seal assembly weight may help significantly to reduce seal contact load, especially at the higher rotor shaft speed. Traditional seal assemblies may have high spring loads leading to higher seal contact pressures and greater heat generation, resulting in increased wear of the seal and decreased seal life. There is a need in the art therefore to provide an improved face seal assembly that can provide a desired seal life at high rotor speeds and reduced seal assembly design space for compact engine design.

SUMMARY OF THE DISCLOSURE

According to an aspect of the present disclosure, an assembly is provided for rotational equipment. This assembly includes a housing, a carrier, a spring element and a seal element. The housing includes a bore and an annular groove that extends axially along a centerline into the housing from the bore. The carrier projects axially along the centerline into the annular groove. The carrier is configured to translate axially along the centerline relative to the housing. The spring element is arranged within the annular groove. The spring element is configured to bias the carrier axially away from the housing along the centerline. The seal element is mounted to the carrier and arranged within the bore.

According to another aspect of the present disclosure, another assembly is provided for rotational equipment. This assembly includes a housing, a carrier, a spring element and a seal element. The housing is configured with a groove. The carrier is partially received within the groove. The carrier is configured to translate axially along a centerline relative to the housing. The spring element is arranged within the groove. The spring element is configured to bias the carrier axially away from the housing along the centerline. The seal element is mounted to the carrier. The seal element is completely axially overlapped by the housing.

According to still another aspect of the present disclosure, another assembly is provided for rotational equipment. This assembly includes a housing, a carrier, a spring element, a seal element and a spacer. The housing is configured with a groove. The carrier is partially received within the groove. The carrier is configured to translate axially along a centerline relative to the housing. The spring element is arranged within the groove. The spring element is configured to bias the carrier axially away from the housing along the centerline. The seal element is mounted to the carrier. The spacer is mounted to the housing axially adjacent the carrier. The carrier includes an L-shaped flange configured to axially and/or circumferentially engage the spacer.

The housing may be further configured with a bore. The seal element may be located within the bore.

The spring element may be configured as or otherwise include a wave spring.

The seal element may be configured as or otherwise include a carbon seal element.

The assembly may also include an anti-rotation feature configured to prevent or limit rotation of the carrier about the centerline.

The assembly may also include a spacer arranged within the bore. The carrier may be arranged axially between the spacer and the spring element.

The assembly may also include a snap ring stopper configured to secure the spacer within the bore.

The spacer may include a spacer base and a spacer projection that projects radially inward from and axially away from the spacer base. The carrier may include a flange configured to circumferentially engage the spacer projection.

The carrier may include a flange configured to axially engage the spacer.

The carrier may include a flange axially engaged by the spring element.

The carrier may include a carrier base and a plurality of flanges arranged circumferentially about the carrier base. A first of the flanges may be configured with an L-shaped geometry. The seal element may be nested within a notch of the carrier base.

The assembly may include a spacer arranged within the annular groove axially between the housing and the spring element.

The seal element may be completely axially overlapped by the housing.

The assembly may include a washer engaged axially between the carrier and the spring element.

The assembly may include a washer engaged axially between the spring element and the housing.

A secondary seal element may be configured to seal a gap between the carrier and the housing.

The assembly may include a rotating structure rotatable about the centerline and comprising a seal land. The seal element may be configured to seal a gap between the carrier and the seal land.

The rotational equipment may be configured as or otherwise include a gas turbine engine.

The present disclosure may include one or more of the features mentioned above and/or below alone or in any combination thereof.

The foregoing features and the operation of the invention will become more apparent in light of the following description and the accompanying drawings.

DETAILED DESCRIPTION

Figure 1:
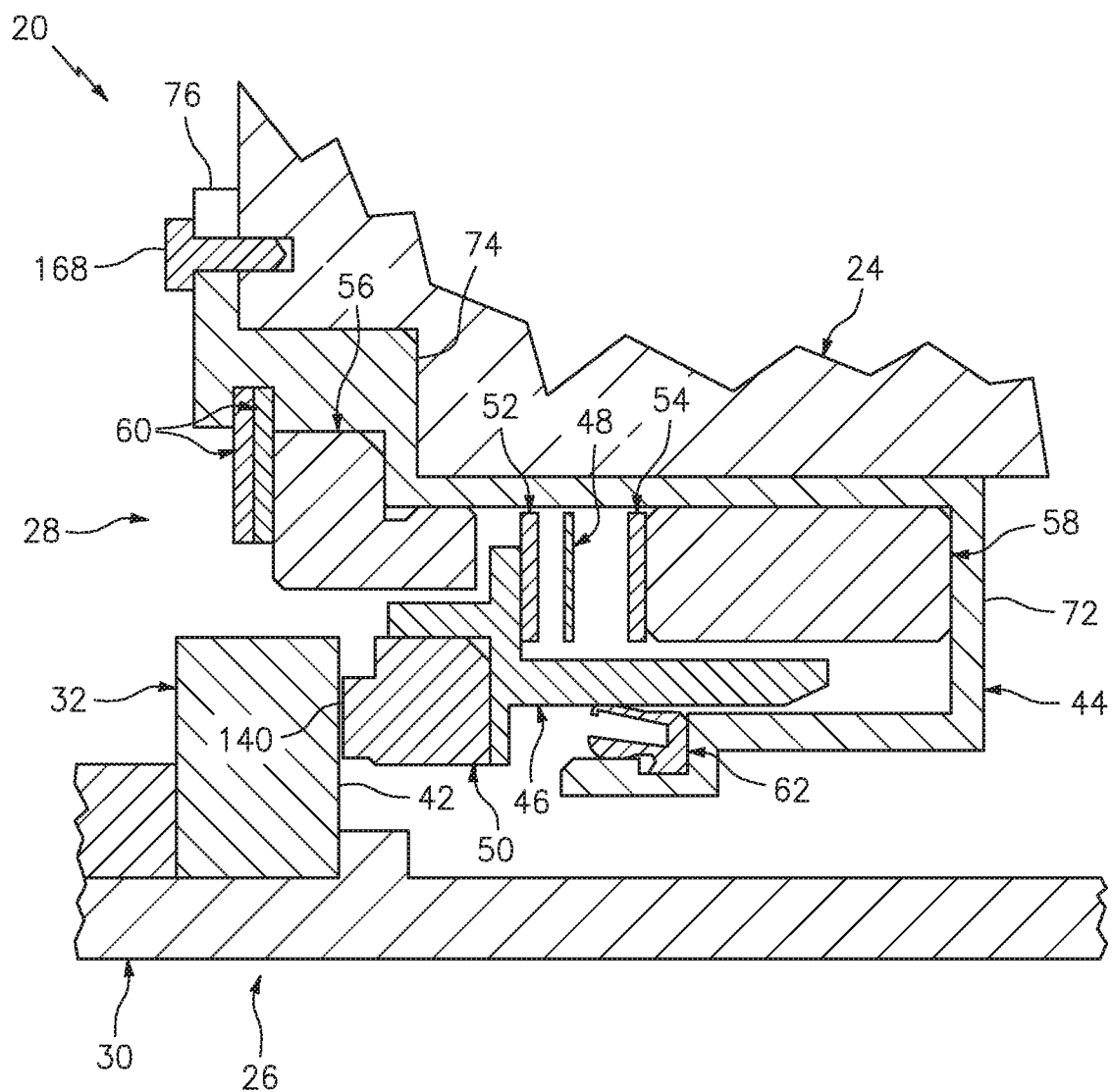
FIG. 1 is a partial side sectional illustration of an assembly for rotational equipment.

FIG. 1 illustrates an assembly 20 for rotational equipment with an axial centerline 22, which centerline 22 may also be an axis of rotation (e.g., a rotational axis) for one or more components of the assembly 20. An example of such rotational equipment is a gas turbine engine for an aircraft propulsion system, an exemplary embodiment of which is described below in further detail with respect to FIG. 19. However, the assembly 20 of the present disclosure is not limited to such an aircraft application nor a gas turbine engine application. The assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The assembly 20 of FIG. 1 includes a stationary structure 24, a rotating structure 26 and a seal assembly 28; e.g., a compact, cartridge seal assembly. The seal assembly 28 is configured to seal an annular gap between the stationary structure 24 and the rotating structure 26 as described below in further detail.

The rotating structure 26 includes a shaft 30 and a seal land 32. The seal land 32 may be configured as a discrete, unitary (e.g., annular) body as shown in FIG. 1. In such embodiments, the seal land 32 is mounted directly or indirectly on the shaft 30 and is thereby rotatable with the shaft 30 about the centerline 22; e.g., the rotational axis of the rotating structure 26. Alternatively, the seal land 32 may be configured with another component/portion of the rotating structure 26. For example, the seal land 32 may be formed as an integral portion of the shaft 30 or another component mounted to the shaft 30.

Figure 2:
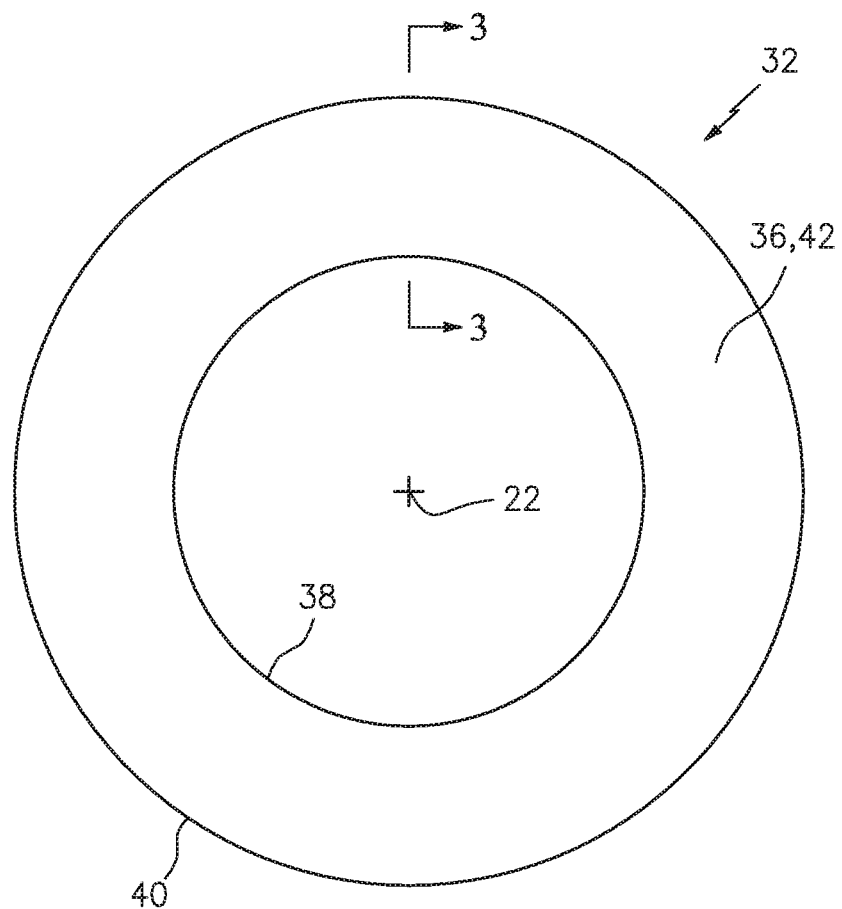
FIG. 2 is an end view illustration of a seal land.

The seal land 32 of FIG. 2 may be configured as an annular full-hoop body. The seal land 32 of FIG. 2, for example, extends circumferentially about (e.g., completely around) the centerline 22. The seal land 32 of FIG. 3 extends axially along the centerline 22 between a first seal land end 34 and a second seal land end 36. The seal land 32 extends radially between an inner seal land side 38 and an outer seal land side 40.

Figure 3:
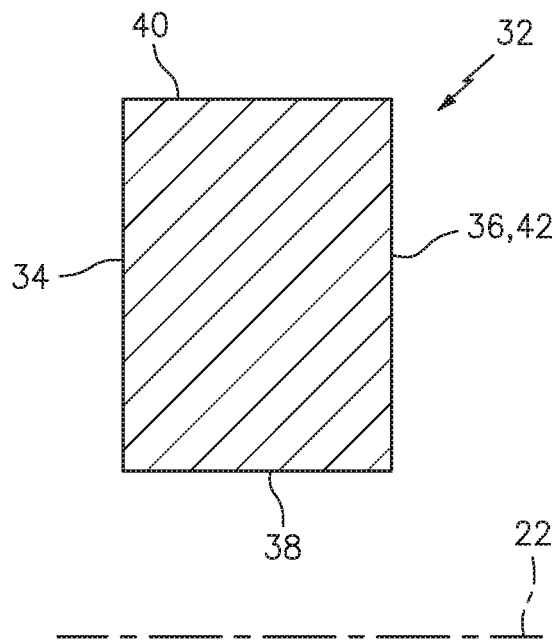
FIG. 3 is a partial side sectional illustration of the seal land taken along line 3-3 in FIG. 2.

The seal land 32 includes a seal land surface 42 at (e.g., on, adjacent or proximate) the second seal land end 36. The seal land surface 42 is a radially extending surface, which may be perpendicular to the centerline 22. The seal land surface 42 may be circumferentially and/or radially uninterrupted. The seal land surface 42 of FIG. 2, for example, extends circumferentially around the centerline 22 and/or radially between opposing edges of the seal land surface 42 without any breaks; e.g., apertures and/or protrusions. The present disclosure, of course, is not limited to such an exemplary seal land surface. For example, in other embodiments, the seal land surface 42 may be circumferentially and/or radially interrupted by one or more apertures; e.g., grooves, ports, etc. The seal land surface 42 of FIGS. 2 and 3 is an annular, planar (e.g., flat) surface.

The seal assembly 28 of FIG. 1 includes a housing 44, a carrier 46, at least one spring element 48 and a seal element 50. The seal assembly 28 of FIG. 1 also includes one or more support elements. These support elements may include, but are not limited to, one or more washers 52 and 54, one or more spacers 56 and 58, one or more stoppers 60 (e.g., annular snap rings) and at least one secondary seal element 62; e.g., an annular C-seal element.

Figure 4:
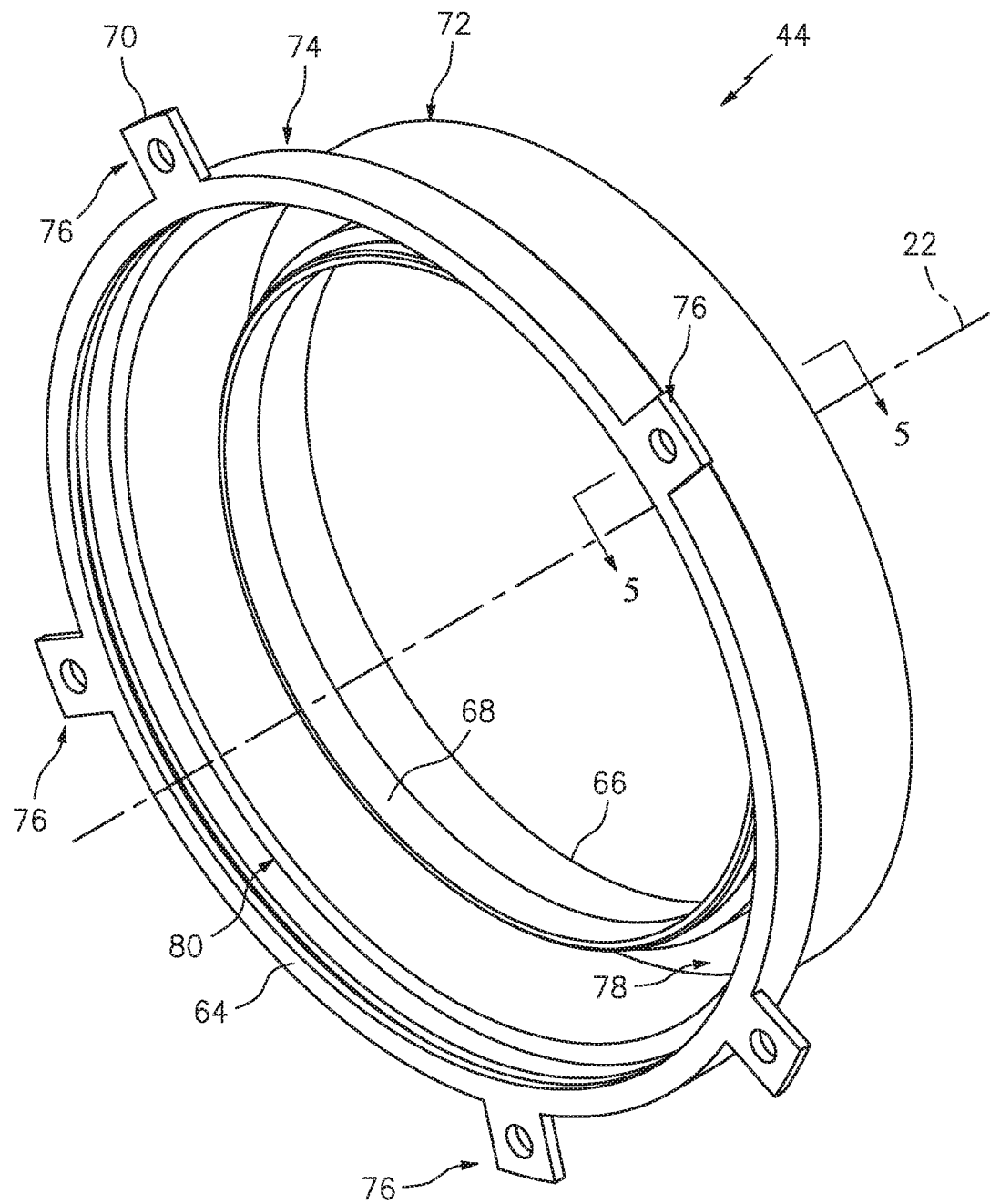
FIG. 4 is a perspective illustration of a housing.

The housing 44 of FIG. 4 may be configured as an annular full-hoop body. The housing 44 of FIG. 4, for example, extends circumferentially about (e.g., completely around) the centerline 22. The housing 44 of FIG. 5 extends axially along the centerline 22 between a first housing end 64 and a second housing end 66. The housing 44 extends radially between an inner housing side 68 and an outer housing side 70.

Figure 5:
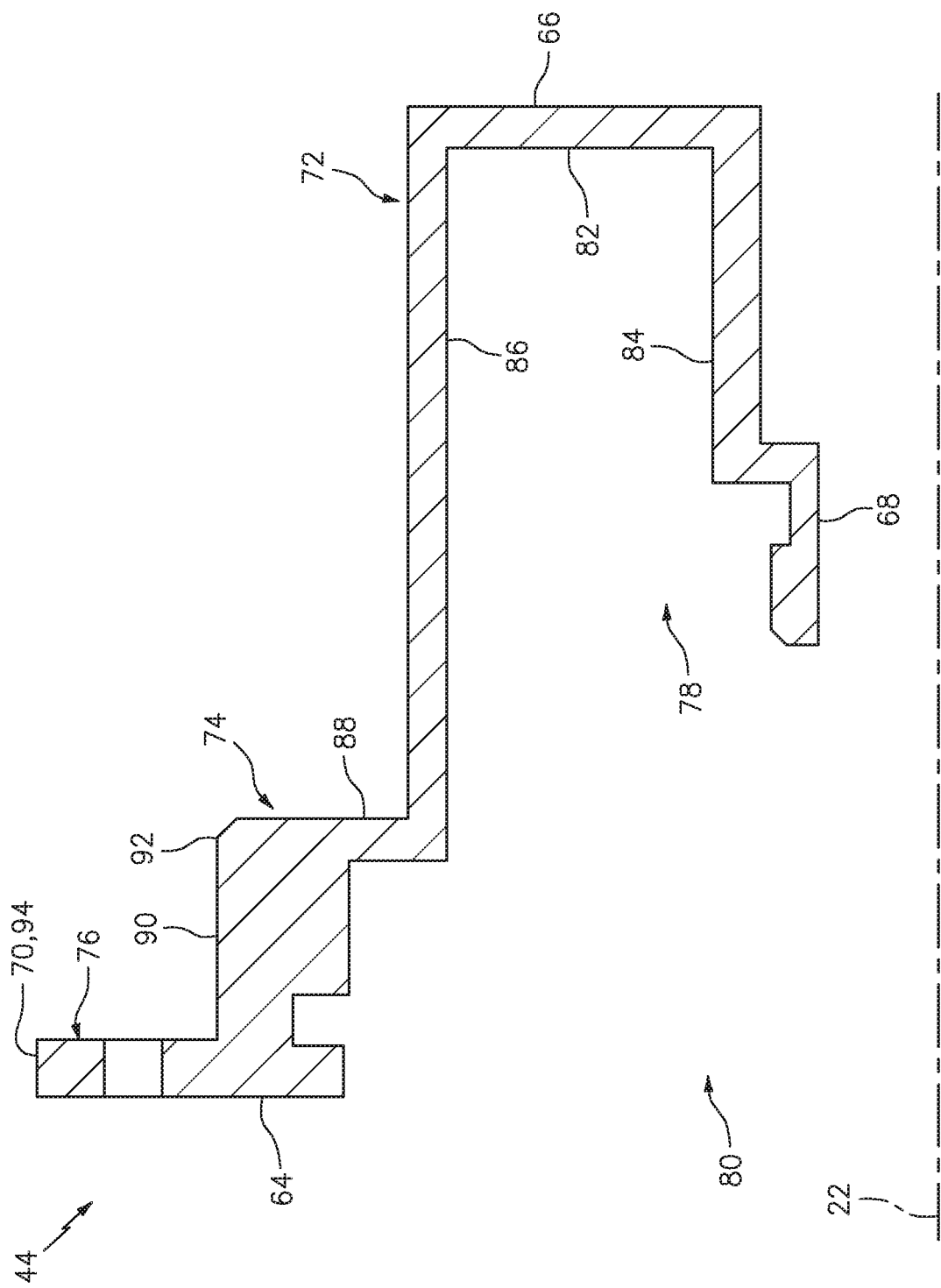
FIG. 5 is a partial side sectional illustration of the housing taken along line 5-5 in FIG. 4.

The housing 44 of FIG. 5 includes an inner housing portion 72, an outer housing portion 74 and one or more housing flanges 76. The inner housing portion 72 is disposed at the second housing end 66 and the inner housing side 68. The inner housing portion 72 may have a generally C-shaped side-sectional geometry in a plane, for example, that is parallel with and/or coincident with the centerline 22 (e.g., plane of FIG. 5). This generally C-shaped side-sectional geometry provides the housing 44 with a groove 78; e.g., an annular groove. It is worth noting, the shape of the groove 78 may be changed to accommodate other types of rings such as a metal piston ring.

The groove 78 extends axially into the inner housing portion 72 from an inner bore 80 of the housing 44, which bore 80 may be formed within and by the outer housing portion 74 and the inner housing portion 72. More particularly, the groove 78 of FIG. 5 extends axially along the centerline 22 into the housing 44 to a groove end surface 82. The groove 78 extends radially within the housing 44 and its inner housing portion 72 between, for example, opposing side surfaces 84 and 86. The outer side surface 86 may also partially form an axial portion of the bore 80. The groove 78 extends within the housing 44 circumferentially about (e.g., completely around) the centerline 22.

The outer housing portion 74 is disposed at the first housing end 64. The outer housing portion 74 includes a radial jog 88 and an axial rim 90. The radial jog 88 projects radially outward from the inner housing portion 72 to a distal end 92. The axial rim 90 is disposed at the distal end 92, and projects axially out from the radial jog 88 to the first housing end 64.

The housing flanges 76 are arranged in an annular array about the centerline 22 at, for example, the first housing end 64. Each of the housing flanges 76 projects radially outward from the axial rim 90 to a distal flange end 94 at the outer housing side 70.

Figure 6:
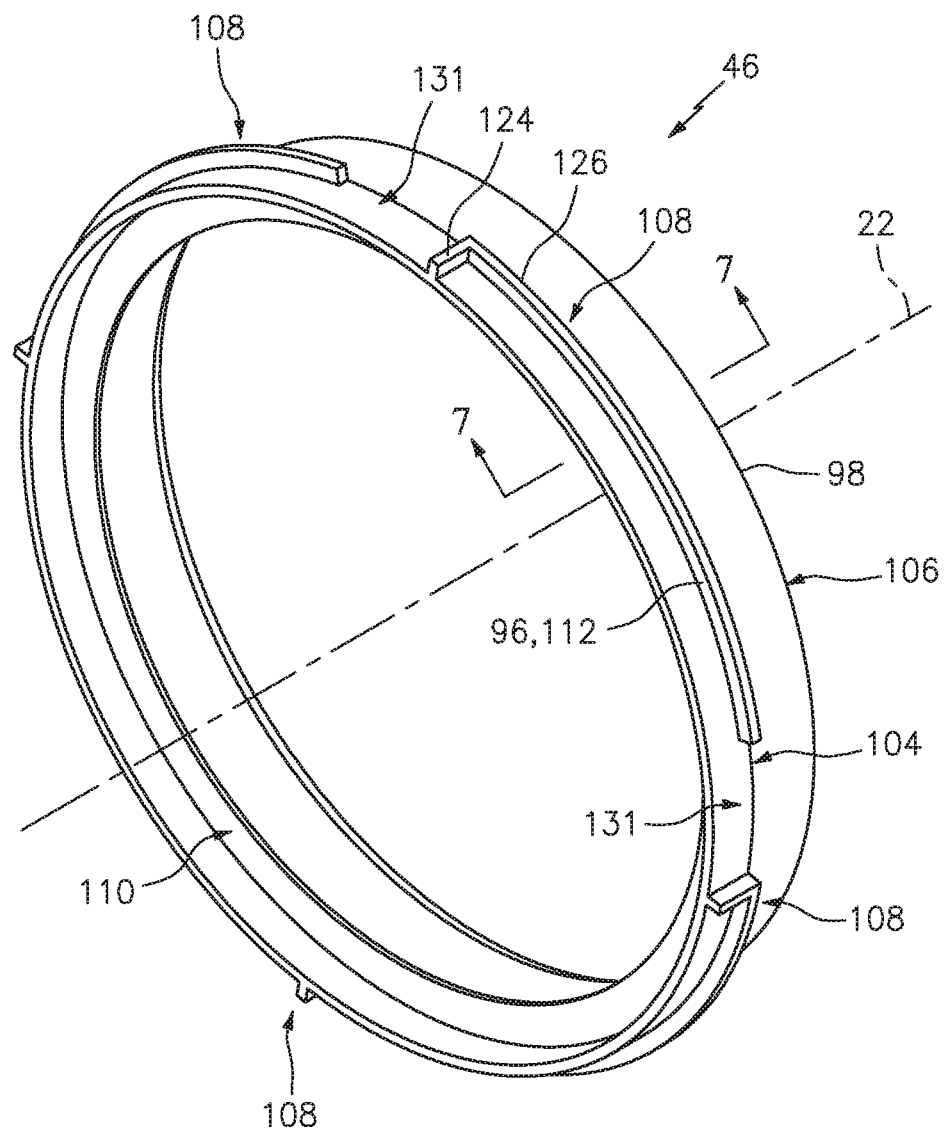
FIG. 6 is a perspective illustration of a carrier.

The carrier 46 of FIG. 6 may be configured as an annular full-hoop body. The carrier 46 of FIG. 6, for example, extends circumferentially about (e.g., completely around) the centerline 22. The carrier 46 of FIG. 7 extends axially along the centerline 22 between a first carrier end 96 and a second carrier end 98. The carrier 46 extends radially between an inner carrier side 100 and an outer carrier side 102.

Figure 7:
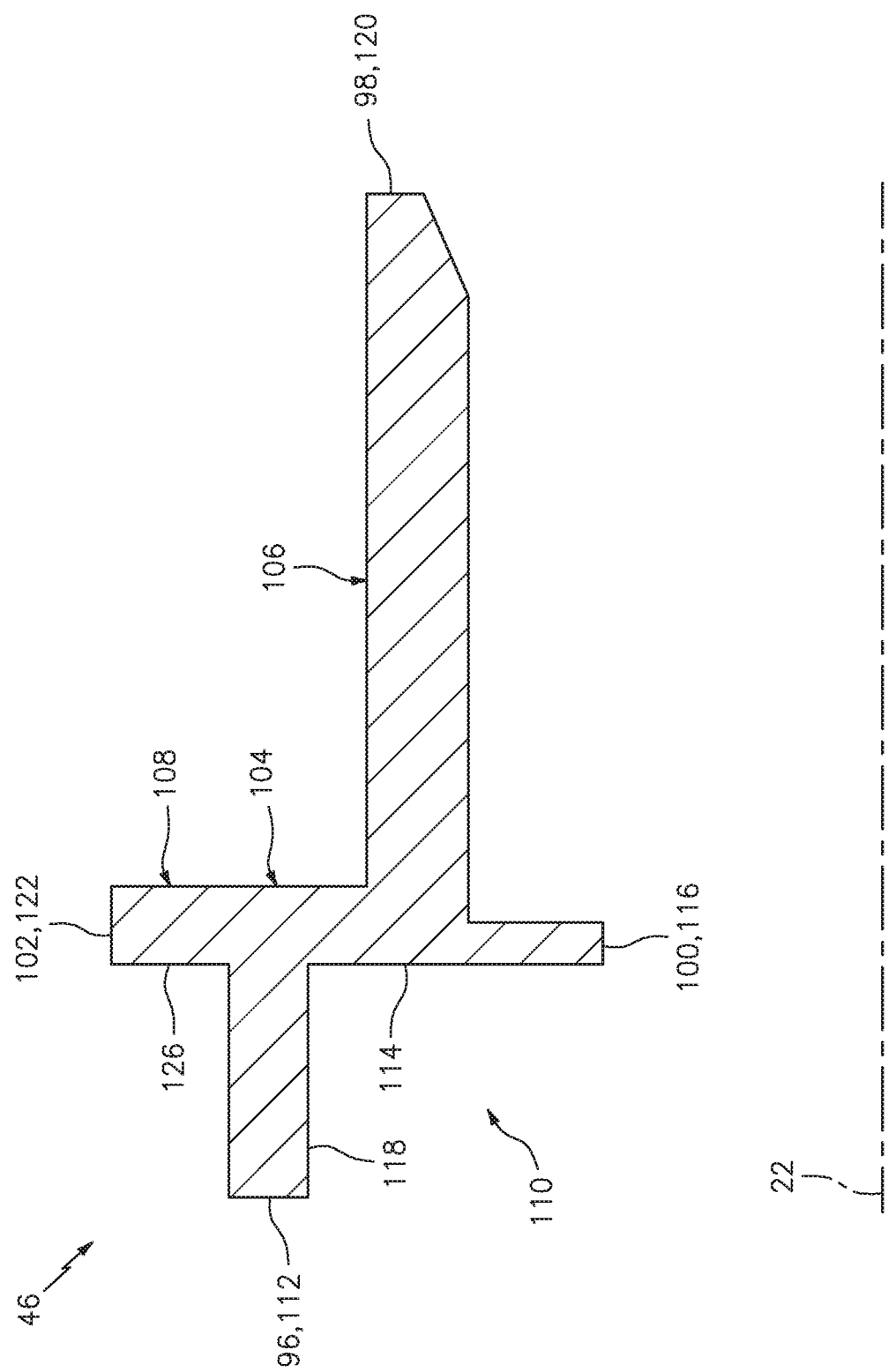
FIG. 7 is a partial side sectional illustration of the carrier taken along line 7-7 in FIG. 6.

The carrier 46 of FIG. 7 includes a carrier base 104, a carrier guide 106 and one or more carrier flanges 108. The carrier base 104 is disposed at the first carrier end 96 and the inner carrier side 100. The carrier base 104 has a generally L-shaped side-sectional geometry in a plane, for example, that is parallel with and/or coincident with the centerline 22 (e.g., plane of FIG. 7). This generally L-shaped side-sectional geometry provides the carrier 46 with a notch 110; e.g., an annular notch.

The carrier base 104 is configured such that the notch 110 faces the centerline 22. The notch 110 of FIG. 7, for example, extends axially into the carrier base 104 from a surface 112 at the first carrier end 96. More particularly, the notch 110 of FIG. 7 extends axially along the centerline 22 into the carrier 46 to a notch end surface 114. The notch 110 extends radially into the carrier base 104 from a surface 116 at the inner carrier side 100. More particularly, the notch 110 of FIG. 7 extends radially into the carrier 46 to a notch side surface 118, which notch side surface 118 may meet the notch end surface 114 at a notch inner corner. The notch 110 extends within the carrier base 104 circumferentially about (e.g., completely around) the centerline 22.

The carrier guide 106 (e.g., an annular rim or flange) may be radially located intermediate between the inner carrier side 100 and the outer carrier side 102. The carrier guide 106 is cantilevered from the carrier base 104. The carrier guide 106, for example, projects axially along the centerline 22 outer from the carrier base 104 to a distal guide end 120 at the second carrier end 98.

Figure 8:
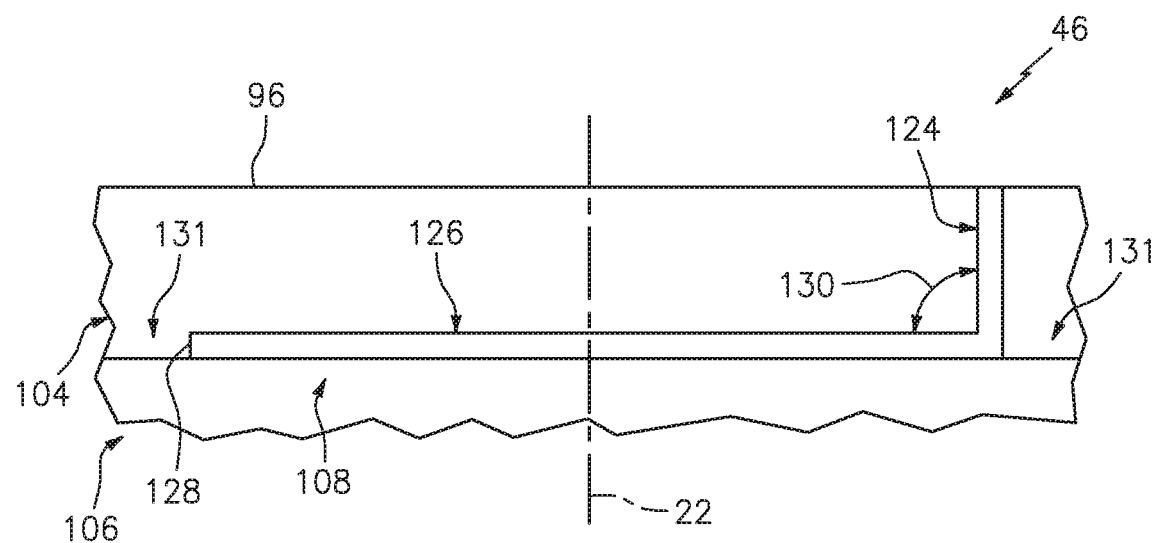
FIG. 8 is a side illustration of a portion of the carrier with a flange.

Referring to FIG. 6, the carrier flanges 108 are arranged in an annular array about the centerline 22 and the carrier base 104. Referring to FIG. 7, each of these carrier flanges 108 projects radially outward from the carrier base 104 to a distal flange end 122 at the outer carrier side 102. Referring now to FIG. 8, each carrier flange 108 may have an L-shape geometry when viewed, for example, in a plane tangent to the carrier 46 (e.g., plane of FIG. 8) at a location of that carrier flange 108. The carrier flange 108 of FIG. 8, for example, includes an axial portion 124 and a circumferential portion 126. The axial portion 124 extends axially along the centerline 22 from, for example, the first carrier end 96 to a corner where the axial portion 124 meets the circumferential portion 126. The circumferential portion 126 extends circumferentially about the carrier base 104 and the centerline 22 from the corner to a distal flange edge 128. The circumferential portion 126 is angularly offset from the axial portion 124 by an angle 130. In the embodiment of FIG. 8, the angle 130 is ninety degrees; e.g., the circumferential portion 126 is perpendicular to the axial portion 124. The present disclosure, however, is not limited to such an exemplary angle.

Referring again to FIG. 6, each carrier flange 108 may be circumferentially spaced from each circumferentially adjacent carrier flange 108 about the carrier base 104. With such a configuration, a gap 131 circumferentially separates each circumferentially adjacent pair of the carrier flanges 108.

The carrier 46 may be constructed from or otherwise include a material such as, but not limited to, metal.

Figure 9:
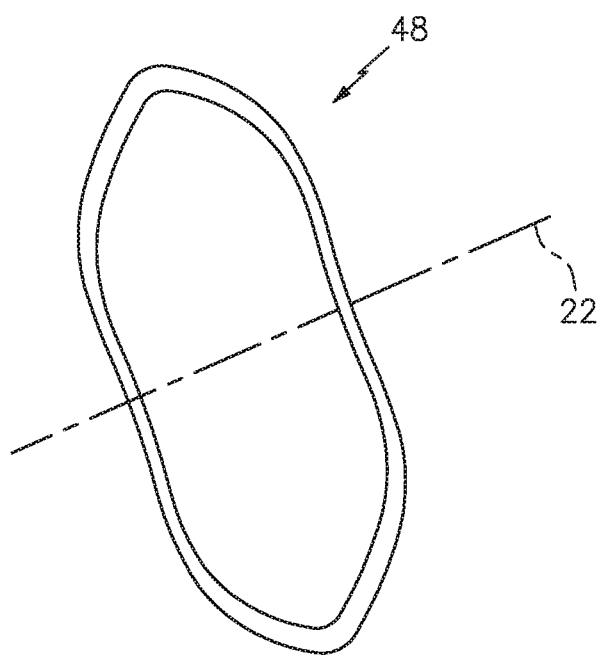
FIG. 9 is a perspective illustration of a spring element.

The spring element 48 of FIG. 9 may be configured as an annular full-hoop body. The spring element 48 of FIG. 9, for example, is configured as a wave spring. A position of a body of the spring element 48, for example, undulates axially back and forth along the centerline 22 as the body extends circumferentially about (e.g., completely around) the centerline 22.

Figure 10:
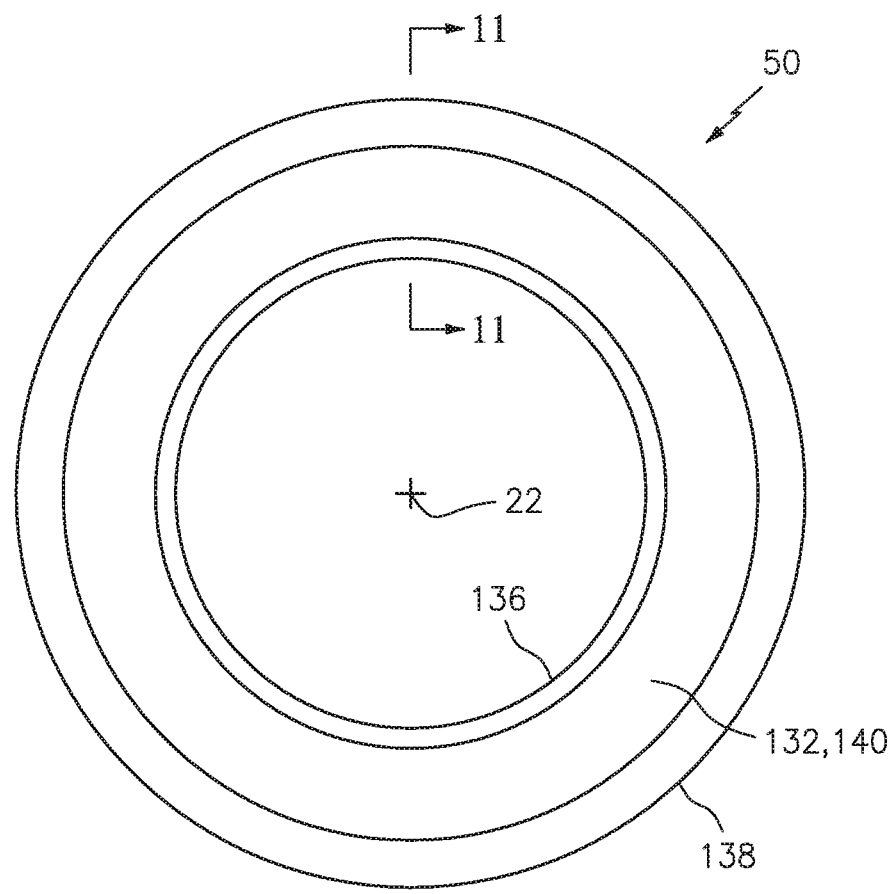
FIG. 10 is an end view illustration of a seal element.

The seal element 50 of FIG. 10 may be configured as an annular full-hoop body. The seal element 50, for example, extends circumferentially about (e.g., completely around) the centerline 22. The seal element 50 of FIG. 11 extends axially along the centerline 22 between a first seal element end 132 and a second seal element end 134. The seal element 50 extends radially from an inner seal element side 136 to an outer seal element side 138.

Figure 11:
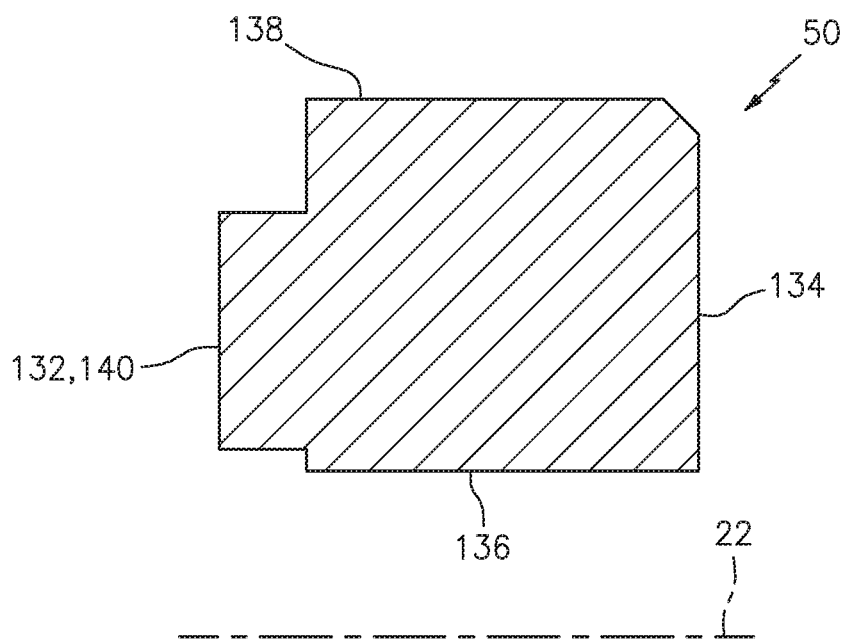
FIG. 11 is a partial side sectional illustration of the seal element taken along line 11-11 in FIG. 10.

The seal element 50 has a seal element surface 140 at the first seal element end 132. This seal element surface 140 is a radially extending surface, which may be perpendicular to the centerline 22. The seal element surface 140 may be circumferentially and/or radially uninterrupted. The seal element surface 140 of FIG. 10, for example, extends circumferentially around the centerline 22 and/or radially between opposing edges of the seal element surface 140 without any breaks; e.g., apertures and/or protrusions. The present disclosure, of course, is not limited to such an exemplary seal element surface. For example, in other embodiments, the seal element surface 140 may be circumferentially and/or radially interrupted by one or more apertures; e.g., grooves, ports, etc. Referring to FIGS. 10 and 11, the seal element surface 140 is an annular, planar (e.g., flat) surface.

The seal element 50 may be configured as a carbon seal element. The seal element 50 may thereby be constructed from a different material than the carrier 46.

Figure 12:
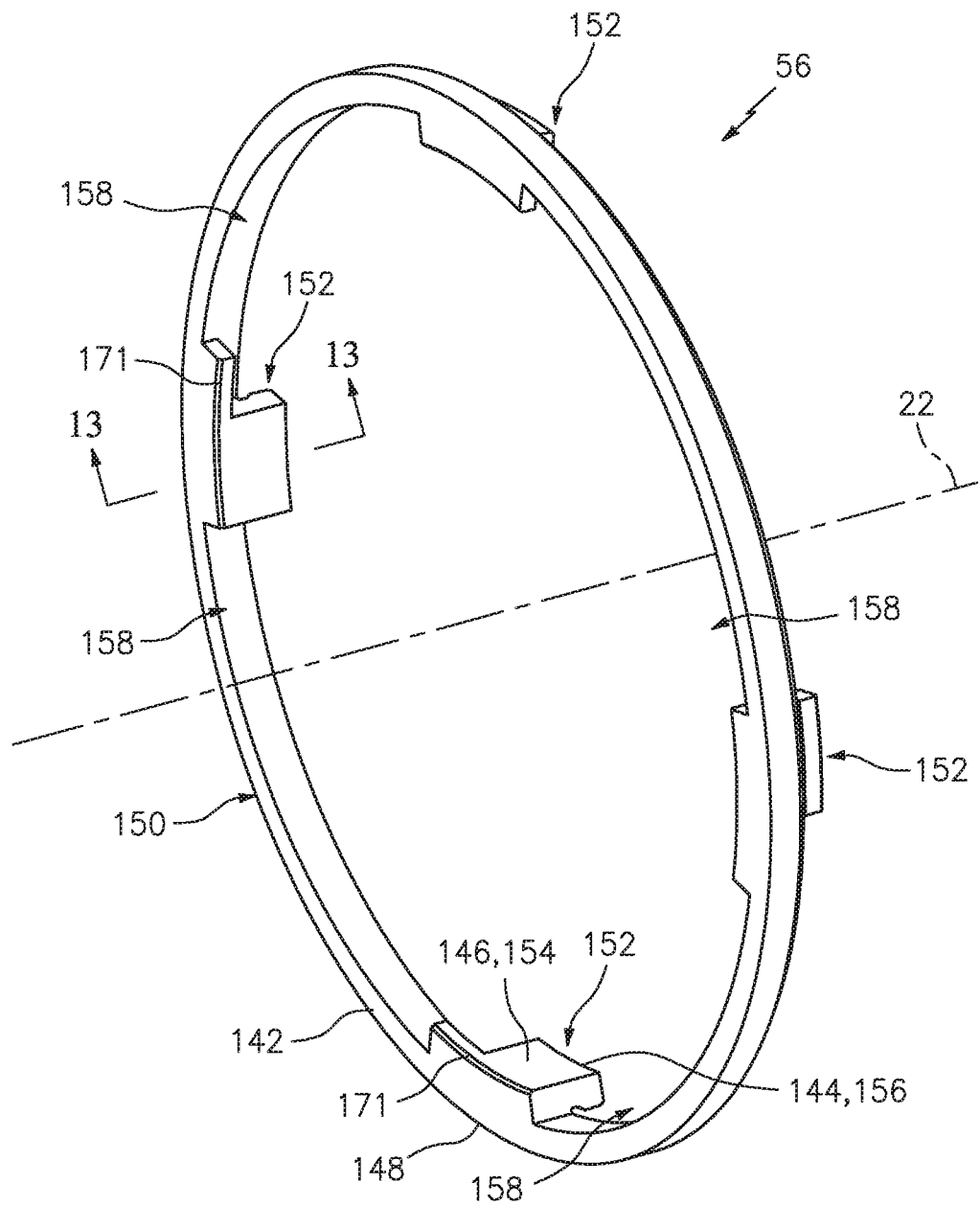
FIG. 12 is a perspective illustration of a carrier spacer.

The carrier spacer 56 of FIG. 12 may be configured as an annular full-hoop body. The carrier spacer 56, for example, extends circumferentially about (e.g., completely around) the centerline 22. The carrier spacer 56 of FIG. 13 extends axially between a first carrier spacer end 142 and a second carrier spacer end 144. The carrier spacer 56 extends radially between an inner carrier spacer side 146 and an outer carrier spacer side 148.

Figure 13:
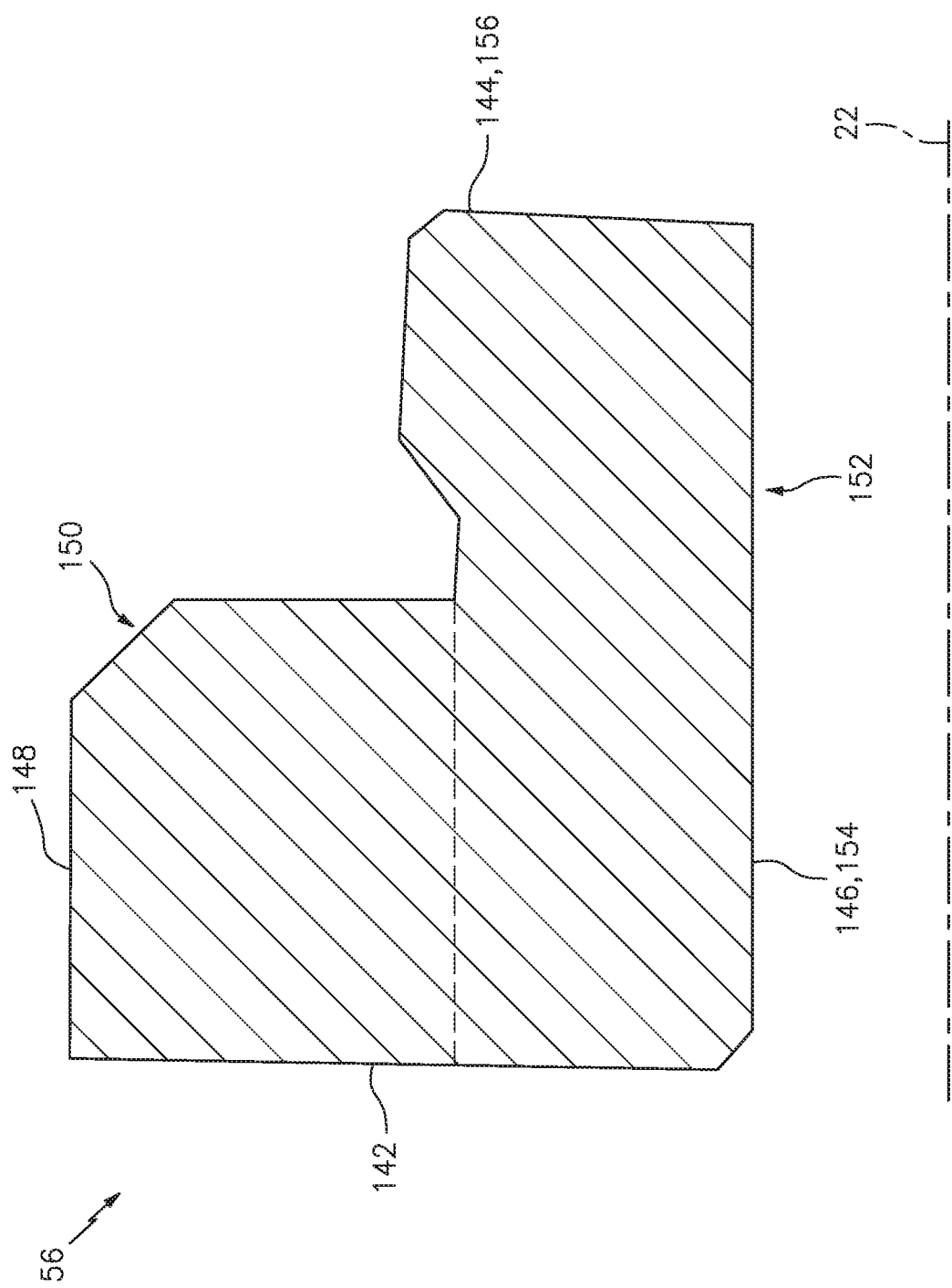
FIG. 13 is a partial side sectional illustration of the carrier spacer taken along line 13-13 in FIG. 12.

The carrier spacer 56 of FIG. 13 includes a carrier spacer base 150 and one or more carrier spacer projections 152. The carrier spacer base 150 is disposed at the first carrier spacer end 142 and the outer carrier spacer side 148. The carrier spacer base 150 extends circumferentially about (e.g., completely around) the centerline 22.

The carrier spacer projections 152 of FIG. 12 are arranged in an annular array about the centerline 22 and the carrier spacer base 150. Each carrier spacer projection 152 of FIG. 13 is disposed at the second carrier spacer end 144 and the inner carrier spacer side 146. Each carrier spacer projection 152 may be configured as a flange or a nub, where the projections 152 may collectively form, for example, an inner castellated rim (see FIG. 12). Each carrier spacer projection 152 projects radially inward from the carrier spacer base 150 to a radial inner distal side 154. Each carrier spacer projection 152 projects axially along the centerline 22 along and/or from the carrier spacer base 150 to an axial distal end 156.

Referring again to FIG. 12, each carrier spacer projection 152 may be circumferentially spaced from each circumferentially adjacent carrier spacer projection 152 about the carrier spacer base 150. With such a configuration, a gap 158 circumferentially separates each circumferentially adjacent pair of the carrier spacer projections 152. A circumferential width of this gap 158 may be equal to or wider than a circumferential width of each carrier flange 108; see FIG. 6. Similarly, a circumferential width of the gap 131 (see FIG. 6) may be equal to or wider than a circumferential with of each carrier spacer projection 152. The present disclosure, however, is not limited to the foregoing exemplary relationships.

Figure 14:
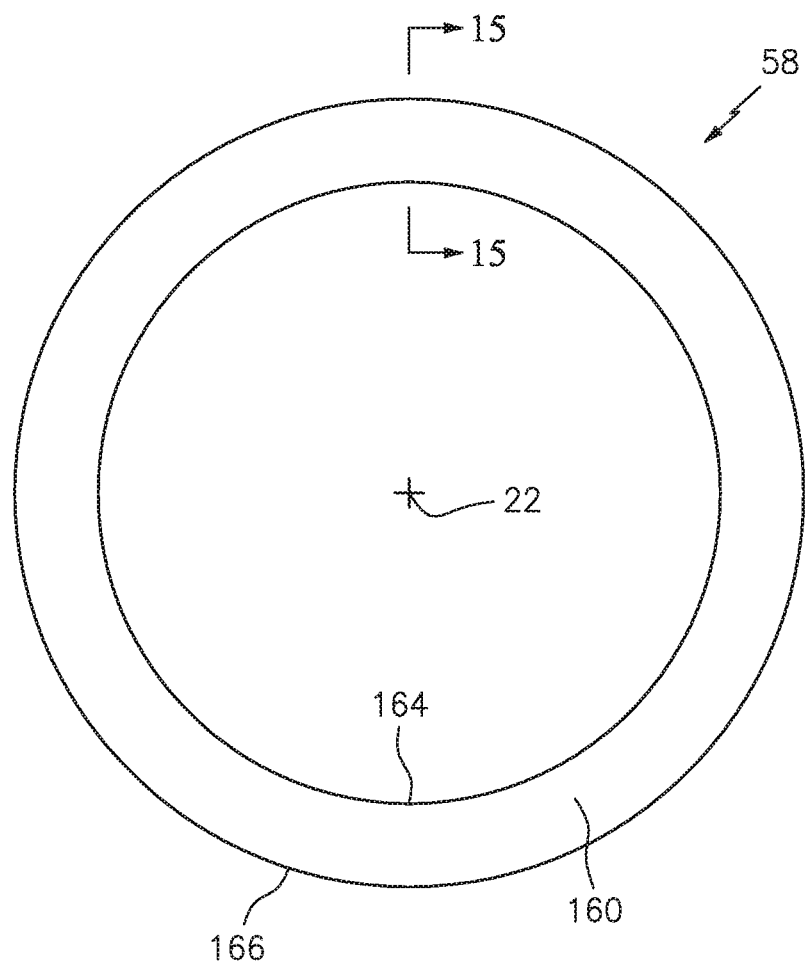
FIG. 14 is an end view illustration of a spring spacer.
Figure 15:
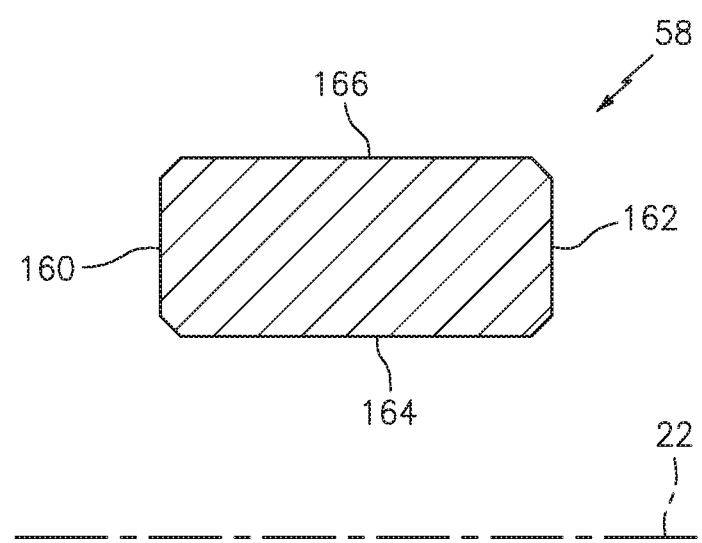
FIG. 15 is a partial side sectional illustration of the spring spacer taken along line 15-15 in FIG. 14.

The spring spacer 58 of FIG. 14 may be configured as an annular full-hoop body. The spring spacer 58, for example, extends circumferentially about (e.g., completely around) the centerline 22. The spring spacer 58 of FIG. 15 extends axially between a first spring spacer end 160 and a second spring spacer end 162. The spring spacer 58 extends radially between an inner spring spacer side 164 and an outer spring spacer side 166.

Referring to FIG. 1, the housing 44 is mounted to the stationary structure 24. The inner housing portion 72 and the outer housing portion 74 of FIG. 1 are arranged within a bore of the stationary structure 24. The housing flanges 76 are axially abutted against the stationary structure 24. Each housing flange 76 may be attached to the stationary structure 24 by, for example, at least one fastener 168; e.g., a bolt.

Figure 16:
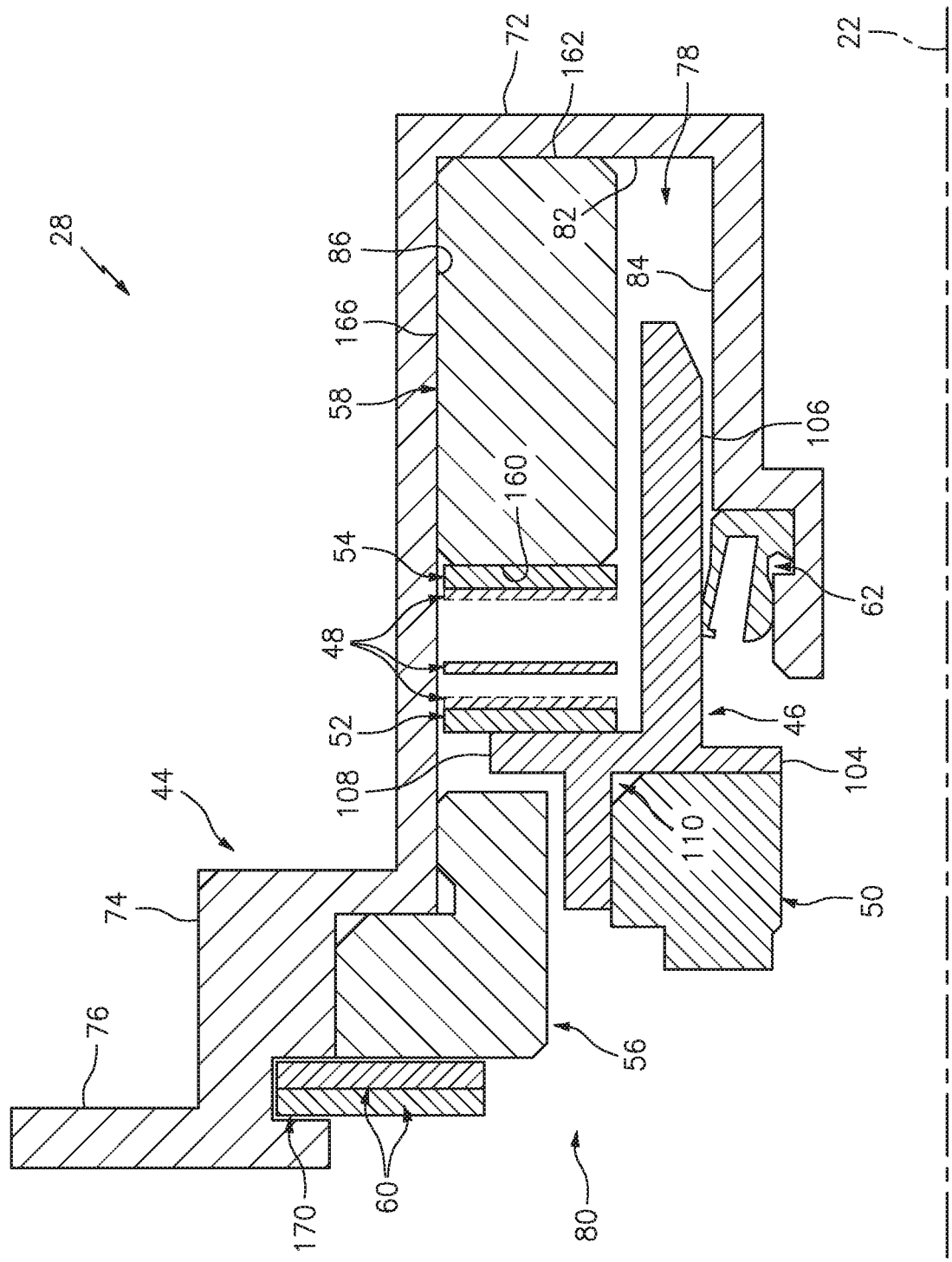
FIG. 16 is a partial side sectional illustration of a seal assembly.

Referring to FIG. 16, the spring spacer 58 is arranged within the groove 78. The second spring spacer end 162 is axially engaged with (e.g., abutted against and/or contacts) the groove end surface 82. The outer spring spacer side 166 is radially engaged with (e.g., abutted against and/or contacts) the outer side surface 86. Of course, in other embodiments, the spring spacer 58 may be an integral portion of the housing 44.

The spring element 48 is located axially between and engaged with (e.g., abutted against and/or contacts) the washers 52 and 54. This stack of elements 52-48-54 is arranged within the groove 78 such that the washer 54 is axially engaged with (e.g., abutted against and/or contacts) the first spring spacer end 160.

The seal element 50 is nested within the notch 110. The seal element 50 may be mounted to the carrier 46 by, for example, an interference fit. Of course, the seal element 50 may also or alternatively be otherwise mechanically fastened and/or bonded to the carrier 46.

The carrier guide 106 is arranged within the groove 78, for example, radially between the spring spacer 58 and the inner side surface 84. Within the groove 78, the carrier guide 106 is operable to translate axially back and forth along the centerline 22 and, thus, move axially relative to the housing 44. The carrier base 104 and/or the carrier flange(s) 108 are axially engaged with (e.g., abutted against and/or contact) the washer 52. The spring element 48 is thereby axially between and (e.g., indirectly) axially engaged with the carrier 46 and the housing 44. Furthermore, the spring element 48 is operable to bias the carrier 46 axially away from the housing 44.

The secondary seal element 62 is mounted with the housing 44 so as to seal a (e.g., annular) gap between the housing 44 and the carrier 46 (e.g., its guide).

Figure 17:
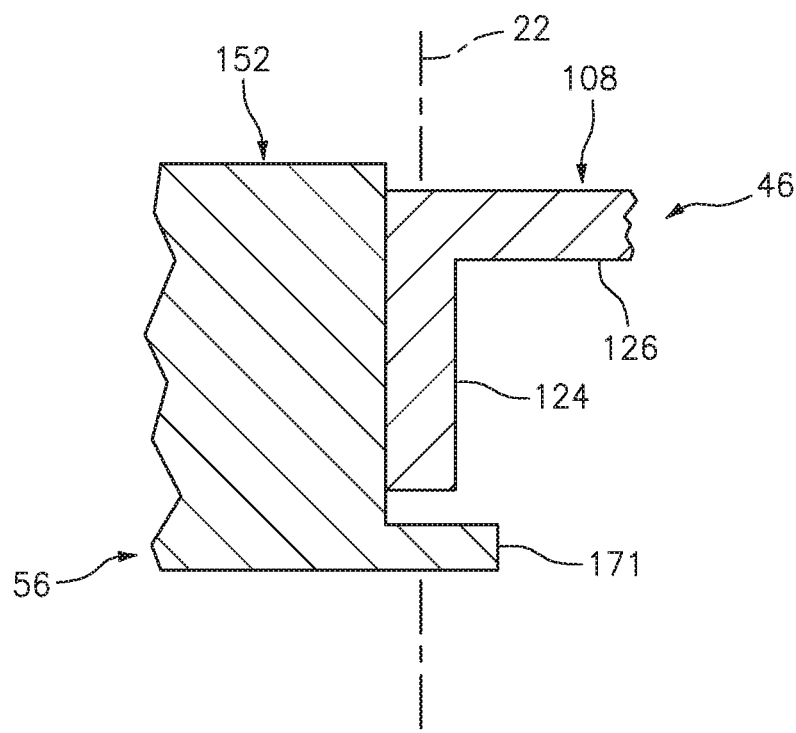
FIG. 17 is a sectional illustration depicting an interface between a carrier flange and a spacer projection during a mode of operation.

The carrier spacer 56 is arranged within the bore 80 of the housing 44. The carrier spacer 56 is located axially next to the carrier 46 and its flanges 108. The carrier spacer 56 is configured to engage the carrier 46 and its flanges 108. For example, referring to FIG. 17, each axial portion 124 is operable to be circumferentially engaged with (e.g., abutted against and/or contacts) a respective one of the carrier spacer projections 152. The elements 108 and 152 thereby collectively form an anti-rotation feature that prevents or limits rotation of the carrier 46 relative to the carrier spacer 56. Thus, relative positions of circumferential anti-rotation engaging surfaces of the axial portion 124 and the carrier spacer projection 152 may depend on the shaft 26 rotation direction; e.g., the elements 124 and 152 may have an opposite arrangement as shown in FIG. 17 where, for example, the shaft 26 rotation occurs in an opposite direction. The carrier spacer 56 may have a circumferential anti rotational feature between housing 44 such as pin, tight fit, etc.

Figure 18:
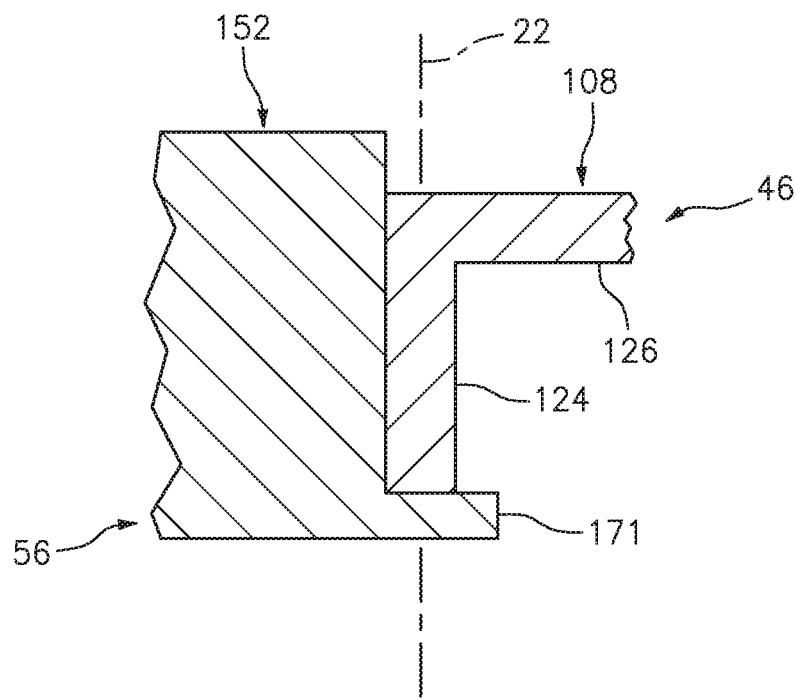
FIG. 18 is a sectional illustration depicting the interface between the carrier flange and the spacer projection during another mode of operation.

During nominal operation, one or more or each axial portion 124 is axially disengaged from (e.g., physically separated from) the carrier spacer 56. However, referring to FIG. 18, during certain conditions (e.g., the seal element 50 is worn down, or at sub-assembly condition shown in FIG. 16, in such a way that helps assembly installation into engine component), one or more or each axial portion 124 may axially engage (e.g., abutted against and/or contact) the carrier spacer 56 and a respective one of its carrier spacer projections 152 (e.g., a circumferential jog 171). The axial portions 124 may thereby form axial movement stops/bumpers.

Referring again to FIG. 16, the stoppers 60 are mated with the housing 44 within the bore 80. The stoppers 60, for example, may be nested within a (e.g., annular) notch 170 in the housing 44. The stoppers 60 are configured to secure the carrier spacer 56 axially within the housing 44.

Referring again to FIG. 1, the seal element 50 is configured to be axially engaged with (e.g., abutted against and/or contact) the seal land 32. The seal element surface 140, for example, is configured to sealingly contact the seal land surface 42 and thereby seal a (e.g., annular) gap between the carrier 46 and the rotating structure 26 and its seal land 32.

The foregoing arrangement may provide the seal assembly 28 with a relatively small/compact form. For example, as shown in FIG. 1, the seal element 50 is disposed within the bore 80 of the housing 44 (opposed to next to the housing 44). In other words, the housing 44 (e.g., completely) axially overlaps the seal element 50 as well as at least partially overlaps the seal land 32. Furthermore, by positioning the elements 46, 48, 52, 54, 56 and/or 58 within the housing 44, a radial height of the seal assembly 28 may be reduced.

Figure 19:
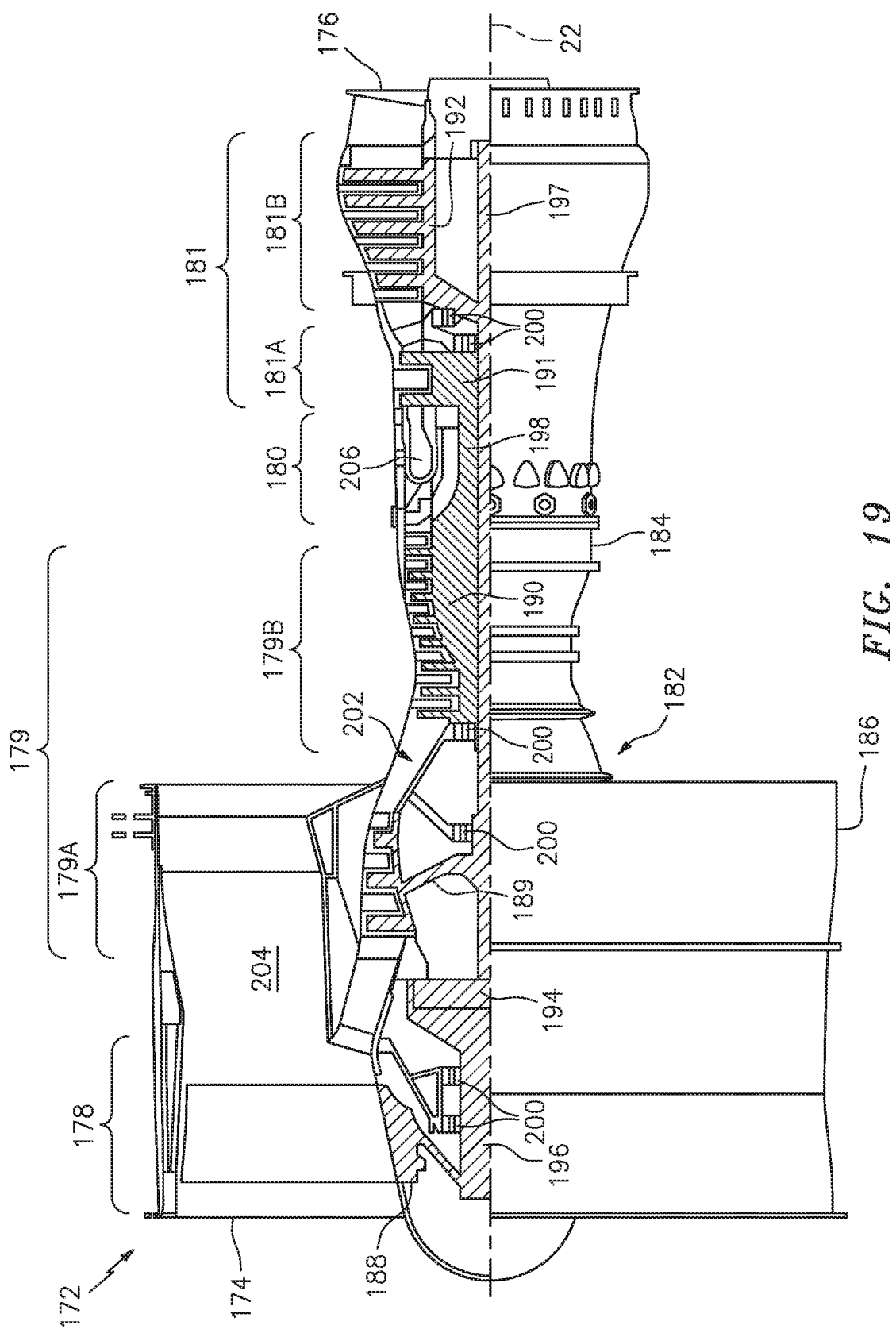
FIG. 19 is a side cutaway illustration of a geared turbofan gas turbine engine.

FIG. 19 is a side cutaway illustration of a geared turbine engine 172 with which the assembly 20 of FIG. 1 may be configured. The turbine engine 172 extends along the centerline 22 between an upstream airflow inlet 174 and a downstream airflow exhaust 176. The turbine engine 172 includes a fan section 178, a compressor section 179, a combustor section 180 and a turbine section 181. The compressor section 179 includes a low pressure compressor (LPC) section 179A and a high pressure compressor (HPC) section 179B. The turbine section 181 includes a high pressure turbine (HPT) section 181A and a low pressure turbine (LPT) section 181B.

The engine sections 178-181 are arranged sequentially along the centerline 22 within an engine housing 182. This housing 182 includes an inner case 184 (e.g., a core case) and an outer case 186 (e.g., a fan case). The inner case 184 may house one or more of the engine sections 179A-181B; e.g., an engine core. The inner case 184 may include the stationary structure 24 of FIG. 1. The outer case 186 may house at least the fan section 178.

Each of the engine sections 178, 179A, 179B, 181A and 181B includes a respective rotor 188-192. Each of these rotors 188-192 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 188 is connected to a gear train 194, for example, through a fan shaft 196. The gear train 194 and the LPC rotor 189 are connected to and driven by the LPT rotor 192 through a low speed shaft 197. The HPC rotor 190 is connected to and driven by the HPT rotor 191 through a high speed shaft 198. One of these shafts 196-198 may be configured as the shaft 30 of FIG. 1. The shafts 196-198 are rotatably supported by a plurality of bearings 200; e.g., rolling element and/or thrust bearings. Each of these bearings 200 is connected to the engine housing 182 by at least one stationary structure such as, for example, an annular support strut.

During operation, air enters the turbine engine 172 through the airflow inlet 174. This air is directed through the fan section 178 and into a core gas path 202 and a bypass gas path 204. The core gas path 202 extends sequentially through the engine sections 179A-181B. The air within the core gas path 202 may be referred to as "core air". The bypass gas path 204 extends through a bypass duct, which bypasses the engine core. The air within the bypass gas path 204 may be referred to as "bypass air".

The core air is compressed by the compressor rotors 189 and 190 and directed into a combustion chamber 206 of a combustor in the combustor section 180. Fuel is injected into the combustion chamber 206 and mixed with the compressed core air to provide a fuel-air mixture. This fuel air mixture is ignited and combustion products thereof flow through and sequentially cause the turbine rotors 191 and 192 to rotate. The rotation of the turbine rotors 191 and 192 respectively drive rotation of the compressor rotors 190 and 189 and, thus, compression of the air received from a core airflow inlet. The rotation of the turbine rotor 192 also drives rotation of the fan rotor 188, which propels bypass air through and out of the bypass gas path 204. The propulsion of the bypass air may account for a majority of thrust generated by the turbine engine 172, e.g., more than seventy-five percent (75%) of engine thrust. The turbine engine 172 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 19), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a housing comprising a bore and an annular groove that extends axially along a centerline into the housing from the bore;
a carrier projecting axially along the centerline into the annular groove, the carrier configured to translate axially along the centerline relative to the housing;
a spring element arranged within the annular groove, the spring element configured to bias the carrier axially away from the housing along the centerline;
a seal element mounted to the carrier and arranged within the bore; and
a spacer arranged within the bore;
the carrier arranged axially between the spacer and the spring element;
the carrier including a carrier base and a plurality of flanges arranged circumferentially about the carrier base;
each of the plurality of flanges configured with an L-shaped geometry when viewed in a plane tangent to the carrier; and
the seal element nested within a notch of the carrier base.

2. The assembly of claim 1, wherein the spring element comprises a wave spring.

3. The assembly of claim 1, wherein the seal element comprises a carbon seal element.

4. The assembly of claim 1, further comprising an anti-rotation feature configured to prevent or limit rotation of the carrier about the centerline.

5. The assembly of claim 1, further comprising a snap ring stopper configured to secure the spacer within the bore.

6. The assembly of claim 1, wherein
the spacer includes a spacer base and a spacer projection that projects radially inward from and axially away from the spacer base; and
a first of the plurality of flanges is configured to circumferentially engage the spacer projection.

7. The assembly of claim 1, wherein a first of the plurality of flanges is configured to axially engage the spacer.

8. The assembly of claim 1, wherein a first of the plurality of flanges is axially engaged by the spring element.

9. The assembly of claim 1, further comprising a second spacer arranged within the annular groove axially between the housing and the spring element.

10. The assembly of claim 1, wherein the seal element is completely axially overlapped by the housing.

11. The assembly of claim 1, further comprising a washer engaged axially between the spring element and the housing.

12. The assembly of claim 1, further comprising a secondary seal element configured to seal a gap between the carrier and the housing.

13. The assembly of claim 1, further comprising a rotating structure rotatable about the centerline and comprising a seal land, the seal element configured to seal a gap between the carrier and the seal land.

14. The assembly of claim 1, wherein the rotational equipment is a gas turbine engine.

15. The assembly of claim 1, wherein
a first of the plurality of flanges includes an axial section and a circumferential section;
the axial section and the circumferential section are disposed radially outboard of the carrier base;
the axial section projects axially out from the circumferential section, along the carrier base, to a distal axial end of the first of the plurality of flanges; and
the circumferential section projects circumferentially out from the axial section, along the carrier base, to a distal circumferential end of the first of the plurality of flanges.

16. An assembly for rotational equipment, comprising:
a housing configured with a groove;
a carrier partially received within the groove, the carrier configured to translate axially along a centerline relative to the housing;
a spring element arranged within the groove, the spring element configured to bias the carrier axially away from the housing along the centerline;
a seal element mounted to the carrier; and
a spacer mounted to the housing axially adjacent the carrier;
the carrier comprising a flange configured to at least one of axially or circumferentially engage the spacer, the flange including an axial section and a circumferential section, the axial section and the circumferential section disposed at a radial outer periphery of the carrier, the axial section projecting axially along the centerline out from the circumferential section to a distal axial end of the flange, and the circumferential section projecting circumferentially about the centerline out from the axial section to a distal circumferential end of the flange.

17. An assembly for rotational equipment, comprising:
a housing comprising a bore and an annular groove that extends axially along a centerline into the housing from the bore;
a carrier projecting axially along the centerline into the annular groove, the carrier configured to translate axially along the centerline relative to the housing;
a spring element arranged within the annular groove, the spring element configured to bias the carrier axially away from the housing along the centerline; and
a seal element mounted to the carrier and arranged within the bore;
the carrier including a carrier base and a plurality of flanges arranged circumferentially about the carrier base;
each of the plurality of flanges configured with an L-shaped geometry when viewed in a plane tangent to the carrier; and
the seal element nested within a notch of the carrier base;
wherein each of the plurality of flanges projects radially out from and circumferentially overlaps the carrier base.

* * * * *